United States Patent
Sugahara et al.

(10) Patent No.: US 7,084,373 B2
(45) Date of Patent: Aug. 1, 2006

(54) TORCH FOR MIG WELDING

(75) Inventors: Toshio Sugahara, Sayama (JP); Noritoshi Takasaki, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/135,042

(22) Filed: May 23, 2005

(65) Prior Publication Data
US 2005/0258157 A1    Nov. 24, 2005

(30) Foreign Application Priority Data
May 24, 2004 (JP) .............................. 2004-153196

(51) Int. Cl.
*B23K 9/173* (2006.01)
(52) U.S. Cl. .............................. 219/137.43; 219/137.42
(58) Field of Classification Search ........... 219/137.43, 219/137.42, 137.2, 136
See application file for complete search history.

(56) References Cited

U.S. PATENT DOCUMENTS 2,833,913 A * 5/1958 Bernard ................. 219/137.43
4,280,043 A * 7/1981 Feix et al. .............. 219/137.43
5,138,969 A * 8/1992 Thielmann ............... 219/137.2

FOREIGN PATENT DOCUMENTS

| GB | 1205626    | 9/1970 |
| GB | 1573731    | 8/1980 |
| JP | 59004980   | 1/1984 |
| JP | 61-017377  | 1/1986 |
| JP | 01148471   | 6/1989 |
| JP | 10-015669  | 1/1998 |
| JP | 2003-001425| 1/2003 |
| JP | 2004249323 | 9/2004 |
| SU | 1402414    | 6/1988 |

* cited by examiner

*Primary Examiner*—Clifford C. Shaw
(74) *Attorney, Agent, or Firm*—Carrier, Blackman & Associates, P.C.; Joseph P. Carrier; William D. Blackman (57) ABSTRACT

A torch for MIG welding includes a gas nozzle for supplying a fluid therethrough to a workpiece, a tip disposed coaxially in the gas nozzle for supplying an electrode wire from a center thereof to a workpiece, and a rotor rotatably supported on the tip. The rotor includes a plurality of blades connected to a bearing rotatably supported on the tip for receiving rotary power due to a flow of fluid through the gas nozzle, a ring joining ends of the blades, and a plurality of spatter removal plates extending axially along an inner surface of the gas nozzle.

20 Claims, 6 Drawing Sheets

TORCH FOR MIG WELDING

BACKGROUND OF THE INVENTION

1. Field of the Invention

The present invention relates to a torch for MIG welding, which is capable of removing spatter deposited on a gas nozzle.

2. Description of the Related Art

According to MIG welding (Metal Inert Gas arc welding), a shielding gas is supplied from the gas nozzle of a torch, and an electrode wire is supplied from the center of a tip disposed axially in the gas nozzle, producing an arc to melt the electrode wire for welding workpieces. MIG welding is more efficient than TIG welding, and is used to weld workpieces of aluminum, copper alloy, soft steel, or the like. The shielding gas comprises an inert gas, such as an argon gas or the like, which prevents the molten metal from becoming oxidized or nitrided during the welding process. Therefore, the shielding gas makes it unnecessary to use a coating material or a flux on the electrode wire.

During the MIG welding process, molten particles tend to be scattered from the pool of molten metal, and deposited as spatter on the tip end or along the inner surface of the gas nozzle, resulting in a reduction in welding efficiency and quality of the welded assembly. For removing welding spatter, there have been proposed a spatter removal device using a rotating brush to remove spatter (see, for example, Japanese Laid-Open Patent Publication No. 61-17377), a spatter removal device that uses a force to press a nozzle to remove spatter (see, for example, Japanese Laid-Open Patent Publication No. 2003-1425), and a spatter removal device that removes spatter with a rotary tool having surface irregularities (see, for example, Japanese Patent No. 3367340).

The spatter removal devices disclosed in Japanese Laid-Open Patent Publication No. 61-17377, Japanese Laid-Open Patent Publication No. 2003-1425 and Japanese Patent No. 3367340 do not involve use of a MIG welding torch. For removing spatter deposited on a gas nozzle, using any of these spatter removal devices, it is necessary to interrupt the MIG welding process, move the torch, and install the torch on the spatter removal device. Kinetic energy is necessary to rotate the brush or the rotary tool, or to press the nozzle, and thus a complex mechanism is required for rotating the brush or the rotary tool, or to press the nozzle.

A MIG welding process may be performed by a torch mounted on the tip of a robot arm. However, a robotic welding process poses a significant burden on the operator, because the operator is required to train the robot how to weld workpieces, in addition to removing spatter.

SUMMARY OF THE INVENTION

It is therefore an object of the present invention to provide a torch for MIG welding, which is capable of removing spatter with a simple arrangement.

Another object of the present invention is to provide a torch for MIG welding, which allows working efficiency and availability of welding system operations to be increased without interrupting the MIG welding process.

A torch for MIG welding according to the present invention includes a hollow gas nozzle for supplying a fluid therethrough, a tip disposed coaxially in the gas nozzle for supplying an electrode wire from a center thereof to a workpiece, and a rotor rotatably supported on the tip, the rotor having a bearing rotatably supported on the tip, a plurality of first blades connected to the bearing for receiving rotary power due to a flow of the fluid, and a foreign matter remover extending axially along an inner surface of the gas nozzle.

When the rotor, including the foreign matter remover, is rotated in the gas nozzle, it can easily remove spattered particles deposited in the gas nozzle. The torch thus has a simple arrangement for removing spattered particles.

If the fluid comprises an inert shielding gas for protecting a region of the workpiece that is to be welded, then spattered particles can be removed while the MIG welding process is being performed on the workpiece. Therefore, the torch has a self-cleaning capability. The MIG welding process can therefore be continuously performed without requiring interruptions for removal of spattered particles, and therefore the working efficiency and availability of welding system operations incorporating the torch are increased.

The rotor may have a ring, with the first blades having respective ends connected to the ring, and wherein the foreign matter remover may be connected to the ring. Thus, forces applied by the foreign matter remover are distributed uniformly to the blades through the ring, and hence local forces are not concentrated on any particular blade or blades, so that the blades can be rotated in balance.

The foreign matter remover may extend to a distal end of the gas nozzle, for preventing spattered particles from being deposited on the distal end of the gas nozzle.

If the rotor is made of a ceramic material, then the rotor has smooth surfaces, which make it difficult for spattered particles to be deposited on the rotor. Since a ceramic rotor is also highly resistant to heat, the rotor can be used in a high-temperature environment, and will not be deformed or modified even if high-temperature spattered particles are brought into contact with the rotor. Since the ceramic rotor is lightweight, it can easily be rotated due to the flow of the shielding gas.

The foreign matter remover may include an air receiver, which is subject to rotary power in the same direction as the first blades, so that the rotor can be rotated more reliably.

The number of the first blades may be in a range of three to nine.

The blades may be angularly spaced at equal intervals around the tip, thereby allowing spattered particles to be removed in equal amounts, and ensuring that the blades can be rotated in balance.

The torch for MIG welding may further include a plurality of second blades, the same in number as the first blades, and which receive rotary power due to the flow of fluid, the second blades being axially spaced from the first blades and being rotatable in unison with the first blades, wherein the first blades and the second blades are kept out of axial alignment with each other when viewed axially along the tip. With this arrangement, the first blades and the second blades are both subject to the shielding gas, and can be rotated more reliably.

The foreign matter remover may comprise two helical plates having a shape formed by twisting respective thin elongate plates the same number of times in one direction about their longitudinal axes, and wherein the helical plates are arranged so as to have successive twists held 90° out of phase with each other. When the shielding gas flows along the helical plates, the helical plates are subject to rotary power from the shielding gas and remove spattered particles. Since the helical plates are arranged such that their successive twists are held 90° out of phase with each other, they can remove spattered particles in axially complementary relation to each other.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Torches for MIG welding according to an embodiment of the present invention, along with modifications thereof, shall be described below with reference to FIGS. 1 through 6.

Figure 1:
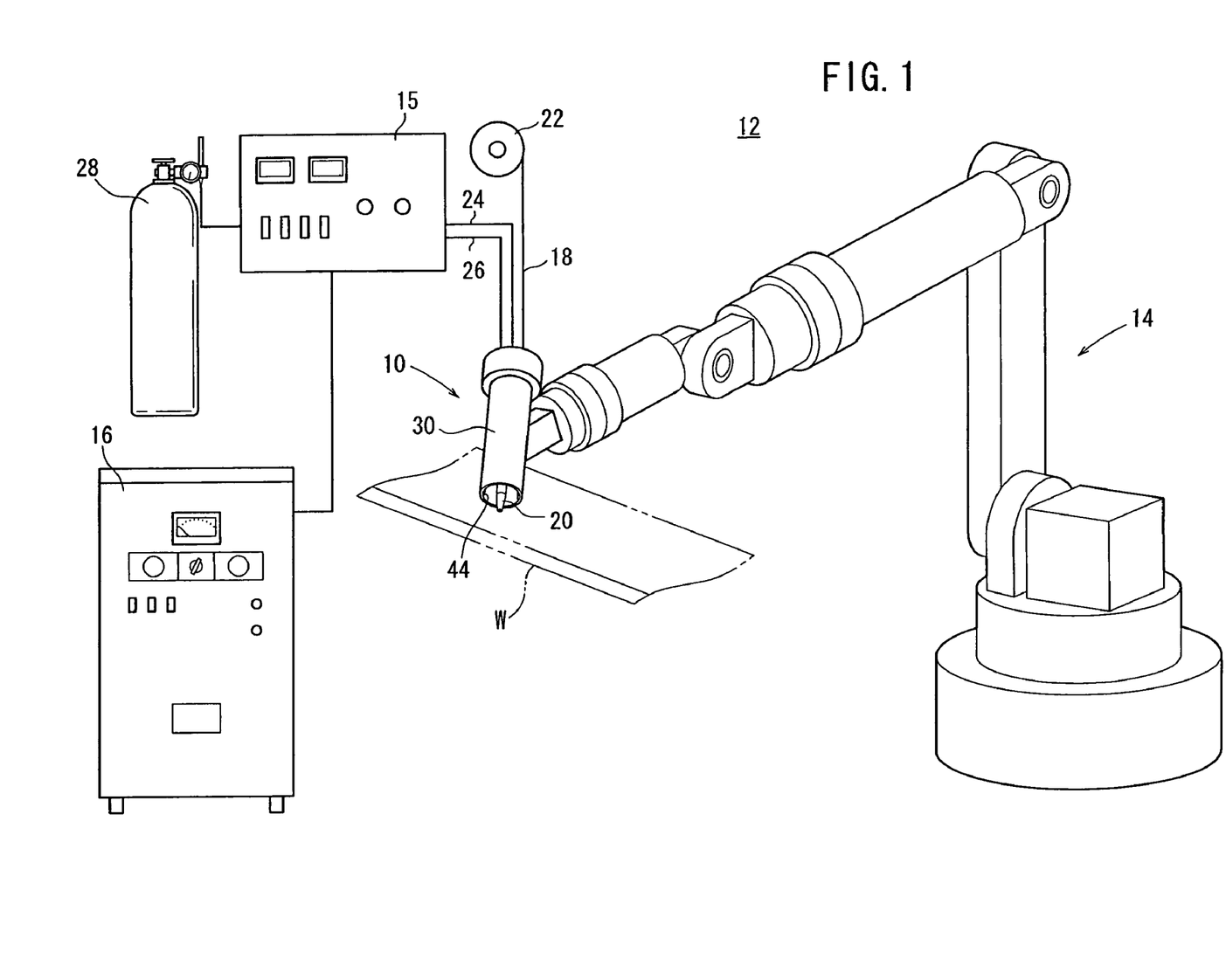
FIG. 1 is a block diagram, partly in perspective, of a welding system having a torch for MIG welding according to an embodiment of the present invention.

As shown in FIG. 1, a torch 10 for MIG welding according to an embodiment of the present invention is mounted as an end effector, on the tip end of an arm of a robot 14, in a welding system 12. The welding system 12 is a system for performing a MIG welding process on a workpiece W, and includes the robot 14, a controller 15, and a power supply unit 16. The torch 10 performs functions to weld the workpiece W, under the control of the controller 15, and can be moved to various positions and take various attitudes through operation of the robot 14.

To the torch 10, there are connected an electrode wire 18 supplied from a wire reel 22, a power supply cable 24, and a gas pipe 26. When the welding system 12 is used in a MIG welding process, the electrode wire 18 is unreeled from the wire reel 22 to a tip end 20 of the torch 10 at a predetermined rate by a feed roller (not shown), and a shielding gas (fluid) is supplied from a gas container 28, through the controller 15 and the gas pipe 26, to a gas nozzle 30 of the torch 10. The shielding gas comprises an inert gas such as argon gas, $CO_2$ gas, or the like. The power supply unit 16 supplies electric energy through the controller 15 and the power supply cable 24 to the electrode wire 18, thereby generating an arc 50 (see FIG. 3) from the tip 20 toward the workpiece W, to perform the MIG welding process.

Figure 2:
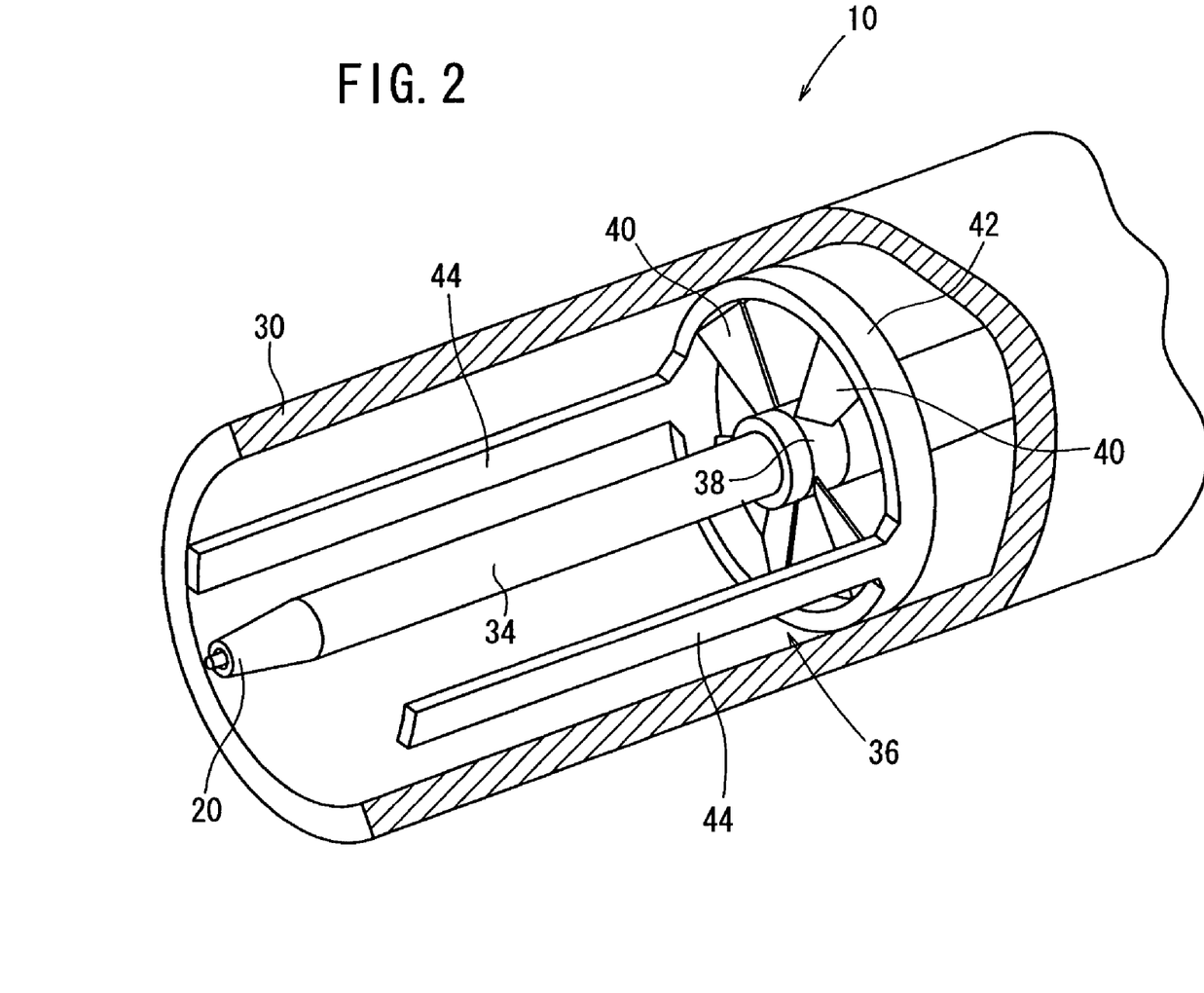
FIG. 2 is a fragmentary perspective view, partly broken away, of the torch for MIG welding according to the embodiment of the present invention.
Figure 3:
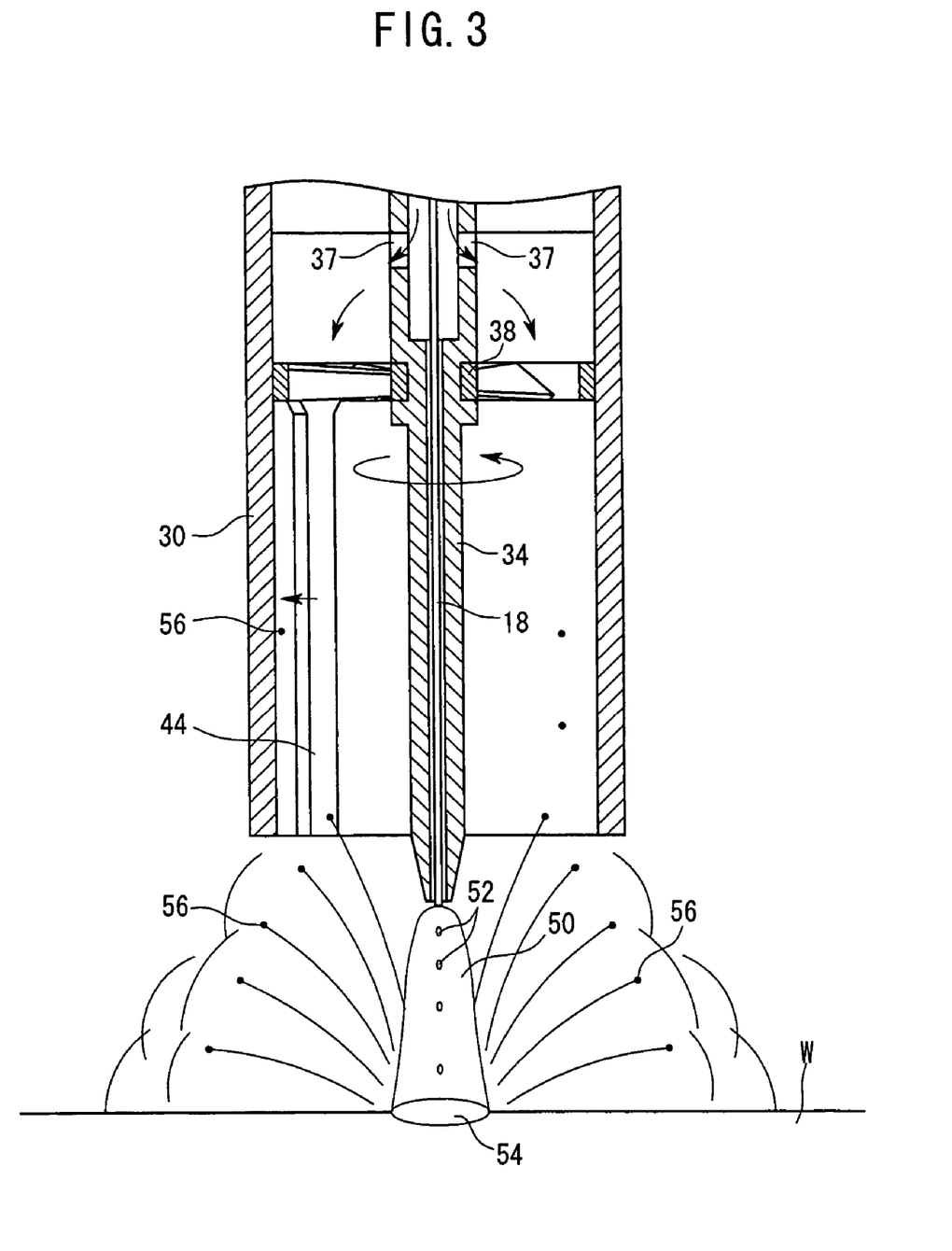
FIG. 3 is a fragmentary longitudinal cross-sectional view of the torch used in a MIG welding process.

As shown in FIGS. 2 and 3, the torch 10 includes the gas nozzle 30, a tip 34 disposed coaxially in the gas nozzle 30 for supplying the electrode wire 18 from a central hole thereof through the tip end 20 on the distal end of the tip 34 to the workpiece W, and a rotor 36 rotatably supported on the tip 34 within the gas nozzle 30. The shielding gas flows from the gas pipe 26 into the tip 34, and then flows through holes 37 defined in the tip 34 upstream of the rotor 36 into the gas nozzle 30, wherein the shielding gas flows toward the open end of the gas nozzle 30. The gas nozzle 30 is of a hollow cylindrical shape, for supplying the shielding gas therethrough to the workpiece W. The gas nozzle 30 may be of any of various hollow shapes, such as a hollow conical shape, which are capable of supplying the shielding gas therethrough to the workpiece W.

The rotor 36 comprises a bearing 38 rotatably supported on the tip 34, a plurality (five in the embodiment) of propeller-shaped blades (first blades) 40 connected to and extending radially outwardly from the bearing 38, and which receive rotary power due to the flow of shielding gas through the gas nozzle 30, a ring 42 integrally joined to radial outer ends of the blades 40 and extending along an inner circumferential surface of the gas nozzle 30, and a pair of spatter removal plates (foreign matter remover) 44 extending axially from the ring 42 along the inner surface of the gas nozzle 30.

The bearing 38 is rotatable with respect to the tip 34, wherein the blades 40 have respective radial inner ends connected to the bearing 38. The five blades 40 are angularly spaced at equal intervals around the bearing 38, and have radial outer ends thereof joined to the inner surface of the ring 42 for rotation in unison with the ring 42. Since the blades 40 are angularly spaced at equal intervals around the tip 34, they allow spatter to be removed in equal amounts, and are rotated in balance.

The number of the blades 40 ranges from three to nine, for example, so that the blades 40 can easily be manufactured, and can be rotated efficiently.

The ring 42 and the spatter removal plates 44 have respective outer circumferential surfaces thereof held in substantial contact with the inner surface of the gas nozzle 30. The two spatter removal plates 44 are positioned in diametrically opposite relation to each other across the bearing 38, and extend from the ring 42 to the distal end of the gas nozzle 30, for removing spattered particles 56 (see FIG. 3) deposited on the inner surface of the gas nozzle 30.

The rotor 36 is made of a ceramic material, and hence is highly resistant to heat, has smooth surfaces, and is lightweight. Since the rotor 36 has smooth surfaces, spattered particles 56 are less liable to become deposited on the rotor 36. Since the rotor 36 is highly resistant to heat, it can be used in a high-temperature environment, and will not be deformed or modified even when high-temperature spattered particles 56 are brought into contact with the rotor 36. Since the rotor 36 is lightweight, it can easily be rotated due to the flow of the shielding gas. The number of the blades 40 is not limited to five, and the number of the spatter removal plates 44 is not limited to two. As many blades 40 and spatter removal plates 44 as considered appropriate may be used and positioned at equal angularly spaced intervals.

A MIG welding process, for MIG-welding the workpiece W using the welding system 12 and incorporating the torch 10, shall be described below.

A robot controller (not shown) is operated to control the robot 14, so as to place the tip end 20 of the tip 34 of the torch 10 in a suitable position with respect to a region of the workpiece W to be welded. Then, the controller 15 supplies the torch 10 both with the shielding gas and with electric energy, for performing the MIG welding process on the workpiece W. As shown in FIG. 3, the shielding gas is ejected from the gas nozzle 30 toward the workpiece W, and an arc 50 is generated in a gas atmosphere between the tip end of the electrode wire 18, which is energized, and the workpiece W. In the arc 50, molten particles 52 from the electrode wire 18 are ejected at high speeds into a molten metal pool 54 formed on the workpiece W. The electrode wire W is unreeled from the wire reel 22 by the feed roller, at a rate depending on the speed at which the electrode wire W is melted for forming the molten particles 52. Because the arc 50 is surrounded by the shielding gas, the molten particles 52 and the molten metal pool 54 do not become oxidized or nitrided, thus making it unnecessary to use any coating material or flux on the electrode wire 18.

When the shielding gas flows through the gas nozzle 30, it impinges upon the blades 40, thereby rotating the rotor 36 and causing the two spatter removal plates 44 to rotate around the tip 34 along the inner surface of the gas nozzle 30.

Upon reaching the molten metal pool 54, some molten particles 52 are scattered as spattered particles 56 from the molten metal pool 54 and reach the inner surface of the gas nozzle 30. Since the spatter removal plates 44 rotate along the inner surface of the gas nozzle 30, passing points on the inner surface of the gas nozzle 30 without any significant time gaps, any spattered particles 56 deposited on the inner surface of the gas nozzle 30 are immediately removed by the spatter removal plates 44. At this time, any spattered particles 56 deposited on the inner surface of the gas nozzle 30 can easily be removed because they still have not solidified due to the high temperature. Since the rotor 36, including the spatter removal plates 44, is made of a ceramic material, and hence is highly heat-resistant, any areas of the rotor 36 that are brought into contact with the high-temperature spattered particles 56 do not become deformed or modified. Since the rotor 36 is made of a ceramic material and has smooth surfaces, spattered particles 56 are less liable to be deposited on the rotor 36. The spatter removal plates 44 can remove not only spattered particles 56, but also other foreign matter such as dust particles deposited on the inner surface of the gas nozzle 30.

When the spatter removal plates 44 remove spattered particles 56, forces applied by the spattered particles 56 to the spatter removal plates 44 are distributed uniformly to the blades 40 through the ring 42, and hence local forces are not concentrated on any particular blades 40.

Torches 10a, 10b, 10c for MIG welding, according to first through third modifications of the present invention, shall be described below with reference to FIGS. 4, 5, and 6, respectively. Those parts of the torches 10a, 10b, 10c which are identical to those of the torch 10 described above are denoted using the same reference characters, and shall not be described below.

Figure 4:
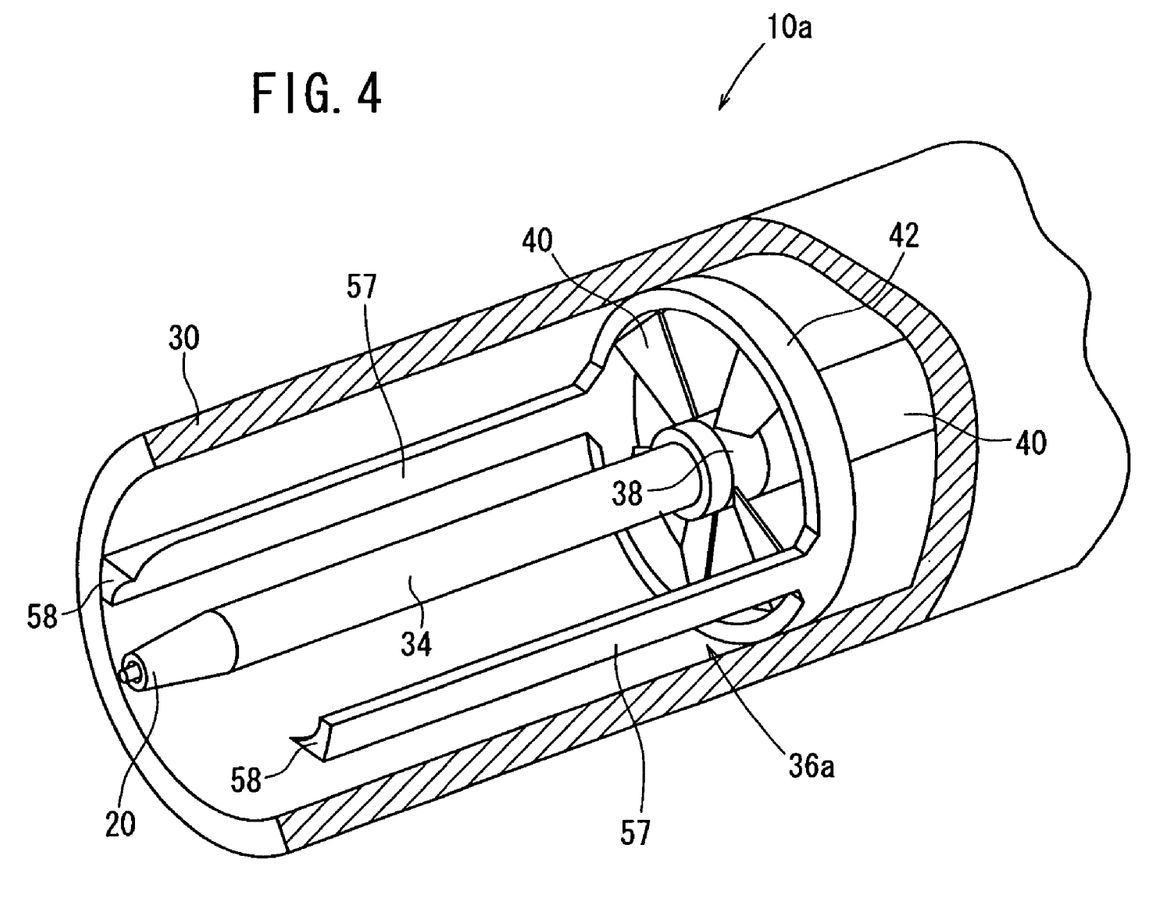
FIG. 4 is a fragmentary perspective view, partly broken away, of a torch according to a first modification of the present invention.

As shown in FIG. 4, the torch 10a according to the first modification includes a rotor 36a having a pair of spatter removal plates (foreign matter remover) 57. The spatter removal plates 57 correspond to the spatter removal plates 44, and the rotor 36a to the rotor 36. Each of the spatter removal plates 57 has, on its distal end, an air receiver 58 having a thickness progressively greater in a circumferential direction of the gas nozzle 30. Since the air receivers 58 of the spatter removal plates 57 are subject to rotary power due to the flow of shielding gas through the gas nozzle 30, the spatter removal plates 57 function in the same manner as the blades 40. The direction of rotary power applied to the air receivers 58 is the same as the direction of rotary power applied to the blades 40. The air receivers 58 of the spatter removal plates 57 enable the rotor 36a to rotate more reliably about the tip 34.

Figure 5:
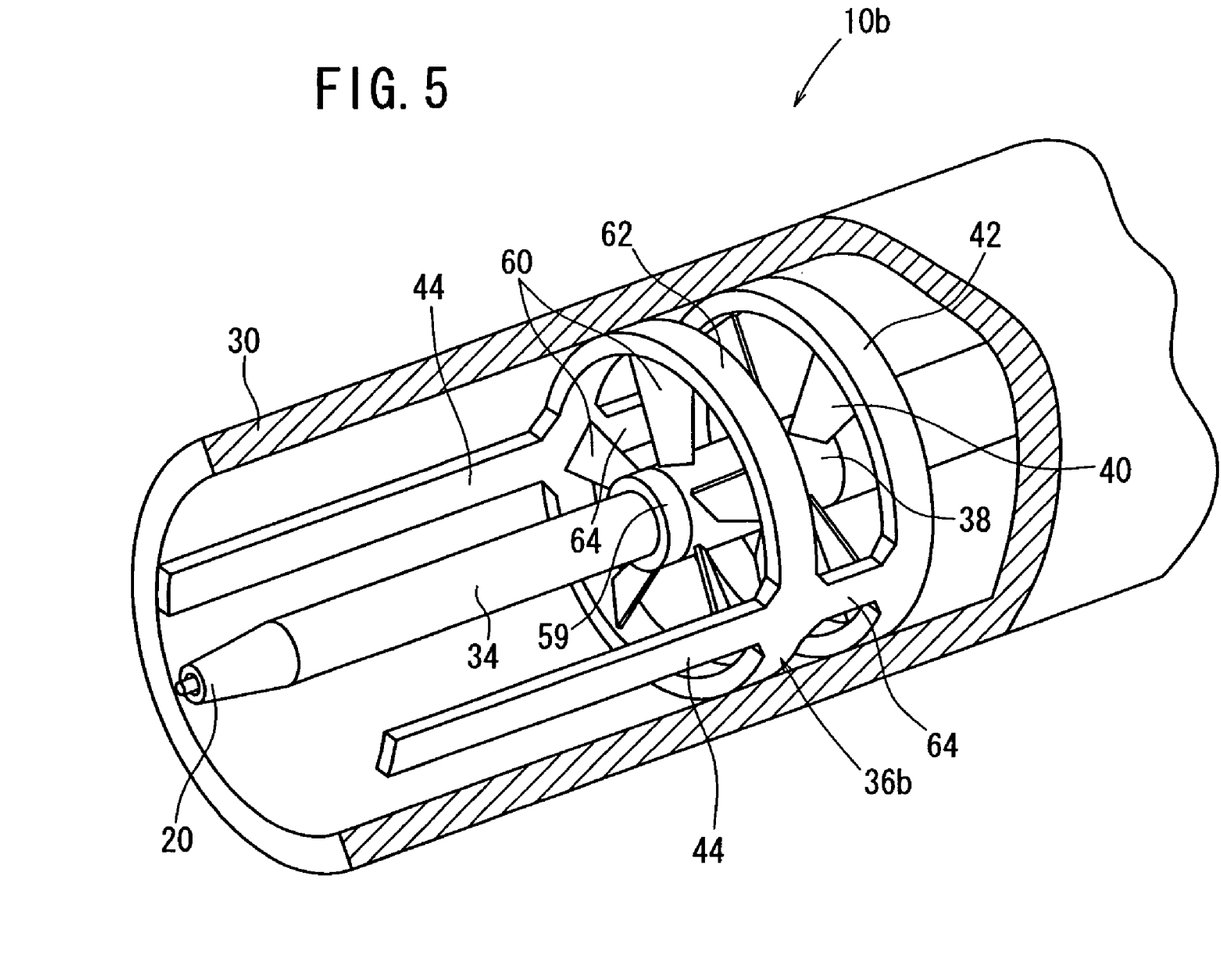
FIG. 5 is a fragmentary perspective view, partly broken away, of a torch according to a second modification of the present invention.

As shown in FIG. 5, the torch 10b according to the second modification includes a rotor 36b, which comprises the bearing 38, the five blades 40, the ring 42, and the two spatter removal plates 44, similar to the rotor 36 shown in FIG. 2. The rotor 36b additionally comprises a bearing 59, five blades (second blades) 60 connected to and extending radially outwardly from the bearing 59, and a ring 62 integrally joined to radial outer ends of the blades 60 and extending along the inner circumferential surface of the gas nozzle 30. The blades 60 are of the same shape as the blades 40. The ring 62 is of the same shape as the ring 42, and is axially connected to the ring 42 by a plurality of supports 64, which extend axially along the inner surface of the gas nozzle 30. The spatter removal plates 44 extend from the ring 62 axially along the inner surface of the gas nozzle 30 to the distal end thereof.

The bearing 59 is rotatably supported on the tip 34 at a position axially spaced from the bearing 38 toward the tip end 20. The five blades 60 are angularly spaced at equal intervals around the bearing 59, and are kept out of axial alignment with the corresponding blades 40. That is, the blades 40 and 60 are alternately positioned when viewed axially along the tip 34, so that the shielding gas flowing through the gas nozzle 30 is applied directly to both sets of blades 40 and 60. Stated otherwise, the adjacent individual blades 40 are angularly spaced 72° from each other, and the adjacent individual blades 60 similarly are angularly spaced 72° from each other, wherein the adjacent sets of blades 40 and 60, positioned in a pair as viewed axially, are angularly spaced 36° from each other.

The five blades 40 and the five blades 60, i.e., all ten blades in total, bear the rotary power caused by the flow of the shielding gas. Therefore, the rotor 36b can be rotated more reliably than the rotors 36 and 36a. Furthermore, since the upstream blades 40 are positioned so as not to block the shielding gas that flows toward the downstream blades 60, the blades 60 also generate effective forces causing rotation of the rotor 36b. In addition, the rotor 36b can rotate more stably than the rotors 36 and 36a because it is rotatably supported by two axially spaced bearings 38 and 59.

Figure 6:
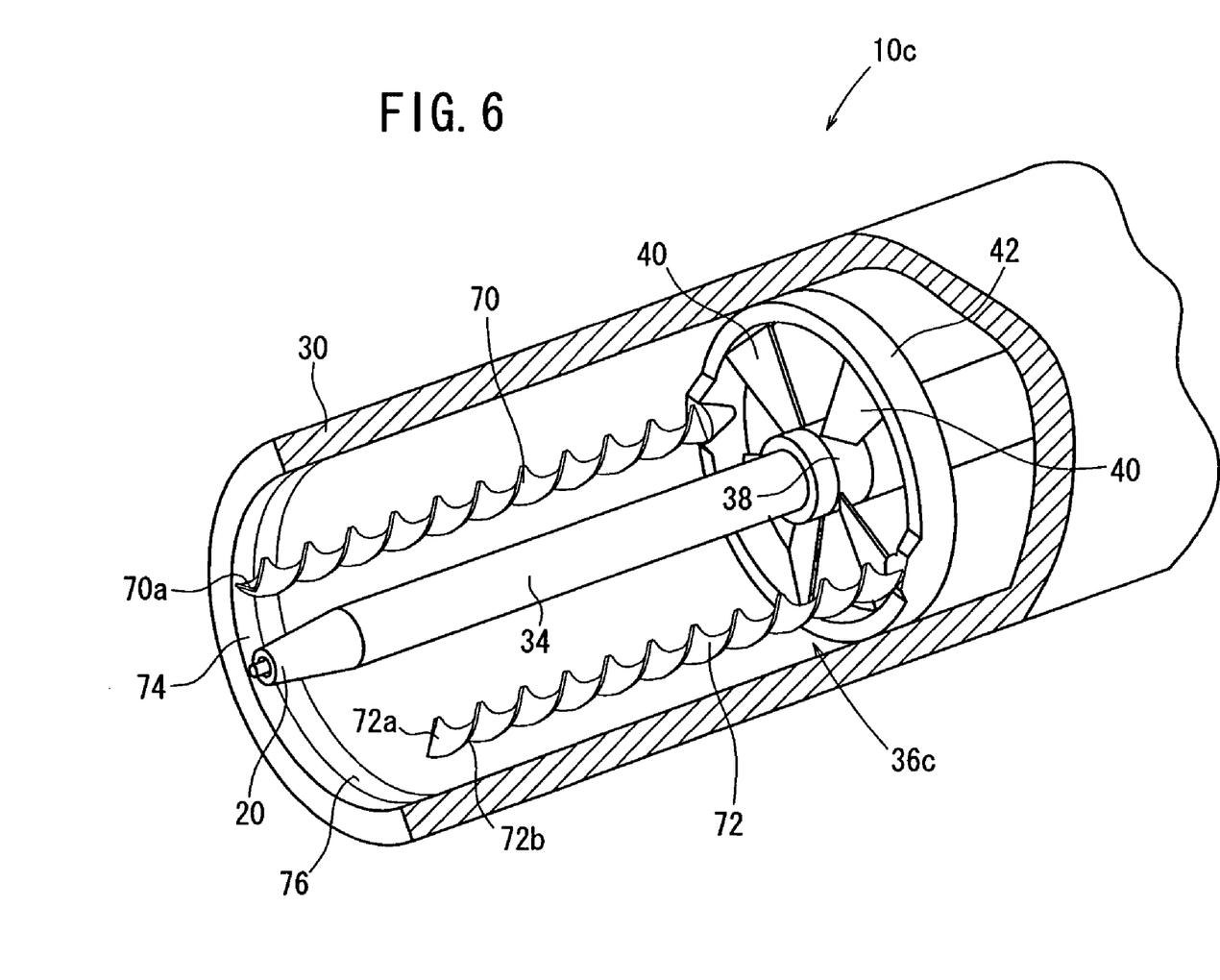
FIG. 6 is a fragmentary perspective view, partly broken away, of a torch according to a third modification of the present invention.

As shown in FIG. 6, the torch 10c according to the third modification includes a rotor 36c, which comprises the bearing 38, the five blades 40, and the ring 42, similar to the rotor 36 shown in FIG. 2. The rotor 36c additionally comprises a pair of helical spatter removal plates (foreign matter remover) 70 and 72. The helical spatter removal plates 70, 72 correspond to the spatter removal plates 44. The helical spatter removal plates 70, 72 are positioned in diametrically opposite relation to each other across the bearing 38, and extend from the ring 42 to the distal end of the gas nozzle 30. The helical spatter removal plates 70, 72 are of a shape formed by twisting respective thin elongate plates the same number of times in one direction about their longitudinal axes. The helical spatter removal plates 70, 72 are arranged such that successive twists thereof are held 90° out of phase with each other.

Because the spatter removal plates 70, 72 are helical in shape, they also are subject to rotary power when the shielding gas flows along the spatter removal plates 70, 72. The direction of rotary power applied to the helical spatter removal plates 70, 72 is the same as the direction of rotary power applied to the blades 40. The helical spatter removal plates 70, 72 enable the rotor 36c to rotate reliably about the tip 34.

The helical spatter removal plates 70, 72 have outer circumferential edges, as viewed from the tip 34, which are held in contact with the inner surface of the gas nozzle 30, and rotate in unison with the ring 42. Therefore, the helical spatter removal plates 70, 72 can remove spattered particles 56 deposited on the inner surface of the gas nozzle 30.

Since the helical spatter removal plates 70, 72 are arranged such that successive twists thereof are held 90° out of phase with each other, portions of the helical spatter removal plates, which are held in contact with the inner surface of the gas nozzle 30, are axially displaced from each other for removing spattered particles 56 in axially complementary relation to each other.

For example, the helical spatter removal plate 70 has a tip end 70a held in contact with a first annular area 74 on the distal end of the inner surface of the gas nozzle 30, for removing spattered particles 56 deposited on the first annular area 74. However, the helical spatter removal plate 70 is not held in contact with a second annular area 76 of the inner surface of the gas nozzle 30, which is upstream of and adjacent to the first annular area 74. Rather, the helical spatter removal plate 72 has a portion 72b disposed upstream of and twisted 90° with respect to a tip end 72a thereof, wherein the portion 72b is held in contact with the second annular area 76 for removing spattered particles 56 deposited on the second annular area 76. Consequently, the area of the inner surface of the gas nozzle 30 is contacted by either one of the helical spatter removal plates 70 or 72, thereby facilitating removal of spattered particles 56 from any position along the inner surface of the gas nozzle 30.

As described above, the torch 10 for MIG welding according to the present invention effectively removes spattered particles 56 that have reached and been deposited on the inner surface of the gas nozzle 30 during a MIG welding process. Therefore, the torch 10 is self-cleaning. The MIG welding process can therefore be continuously performed, without requiring interruptions for removal of spattered particles 56, and therefore working efficiency and availability of operations of the welding system 12 are increased.

Since foreign matter, including such spattered particles 56, is not deposited inside the gas nozzle 30, problems such as a failure of the arc 50, or a reduction in the amount of supplied shielding gas, can be avoided.

Since spattered particles 56 are removed by the rotor 36, which makes up part of the torch 10, a separate dedicated device for removal of spattered particles 56 is not required.

The rotor 36 is rotated as a result of the flow of shielding gas through the gas nozzle 30. Consequently, the torch 10 does not need any additional motive energy, or any additional rotating device, and hence is small in size and light in weight. The rotor 36, which is rotatable about the tip 34, is of a simple structure free of extraneous moving parts, and is highly reliable in operation. The rotor 36 can be attached to a conventional torch simply by modifying a portion of the tip 34.

The robot 14 per se is not required to perform any special operations for removing spattered particles 56. Therefore, the robot 14 does not need to be trained for removing spattered particles 56, and hence the burden on the operator for operating the robot 14 can be reduced.

The spatter removal plates 44, which serve as a means for removing foreign matter, may be of various shapes, which take into account the rotational speed of the rotor 36 and the capability thereof to remove spattered particles 56. For example, the spatter removal plates 44 may also be of a brush shape or a stay shape (spatter removal members). The rotational speed of the rotor 36 may be detected, wherein the supplied amount of shielding gas may be adjusted to set the detected rotational speed of the rotor 36 to a predetermined rotational speed.

As described above, the rotor 36 is rotated due to a motive power provided by the flowing shielding gas. However, the fluid used to rotate the rotor 36 is not limited to the shielding gas, but may also be water, oil, air, or the like. In particular, when a maintenance process is carried out for cleaning the welding system 12, a fluid such as water, oil, air, or the like, rather than the shielding gas, is supplied to rotate the rotor 36, thereby removing extraneous foreign matter from the gas nozzle 30.

The material from which the rotor 36 is made is not limited to ceramics, but may be a metal material such as a copper alloy or the like, a synthetic resin, or a metal material or synthetic resin having a ceramic coating. The blades 40 are not limited to propeller-shaped blades, but may be of any configuration, as long as they are capable of being subject to rotary power when a force of the flowing fluid is applied thereto. The rotors 36a, 36b, 36c also offer the same advantages as those of the rotor 36.

Although certain preferred embodiments of the present invention have been shown and described in detail, it should be understood that various changes and modifications may be made therein without departing from the scope of the appended claims.

The invention claimed is:

1. A torch for MIG welding comprising:
   a hollow gas nozzle for supplying a fluid therethrough;
   a tip disposed coaxially in said gas nozzle for supplying an electrode wire from a center thereof to a workpiece; and
   a rotor rotatably supported on said tip;
   said rotor comprising:
      a bearing rotatably supported on said tip;
      a plurality of first blades connected to said bearing and receiving rotary power due to a flow of said fluid; and
      a foreign matter remover extending axially along an inner surface of said gas nozzle.

2. A torch for MIG welding according to claim 1, wherein said fluid comprises an inert shielding gas for protecting a region to be welded on said workpiece.

3. A torch for MIG welding according to claim 1, wherein said rotor comprises a ring, said first blades having respective ends connected to said ring, and wherein said foreign matter remover is connected to said ring.

4. A torch for MIG welding according to claim 1, wherein said foreign matter remover extends to a distal end of said gas nozzle.

5. A torch for MIG welding according to claim 1, wherein said rotor is made of a ceramic material.

6. A torch for MIG welding according to claim 1, wherein said foreign matter remover comprises an air receiver, which is subject to rotary power in the same direction as said first blades.

7. A torch for MIG welding according to claim 1, wherein the number of said first blades is in a range of three to nine.

8. A torch for MIG welding according to claim 1, wherein said blades are angularly spaced at equal intervals around said tip.

9. A torch for MIG welding according to claim 1, further comprising:
   a plurality of second blades, which are the same in number as said first blades, for receiving rotary power due to the flow of said fluid, said second blades being axially spaced from said first blades,
   wherein said second blades are rotatable in unison with said first blades, and
   wherein said first blades and said second blades are kept out of axial alignment with each other when viewed axially along said tip.

10. A torch for MIG welding according to claim 1, wherein said foreign matter remover comprises two helical plates having a shape formed by twisting respective thin elongate plates the same number of times in one direction about their longitudinal axes, said helical plates being arranged such that said helical plates have successive twists held 90° out of phase with each other.

11. A torch for MIG welding comprising:
a hollow gas nozzle for supplying a fluid therethrough;
a tip disposed coaxially in said gas nozzle for supplying an electrode wire from a center thereof to a workpiece; and
a rotor rotatably supported on said tip such that said rotor receives a rotating power due to a flow of said fluid through said nozzle, and including a foreign matter remover extending axially along an inner surface of said gas nozzle.

12. A torch for MIG welding according to claim 11, wherein said fluid comprises an inert shielding gas for protecting a region to be welded on said workpiece.

13. A torch for MIG welding according to claim 11, wherein said rotor further includes a bearing rotatably supported on said tip, a plurality of blades connected to said bearing and receiving rotary power due to a flow of said fluid, and a ring, said blades having respective ends connected to said ring, and said foreign matter remover is also connected to said ring.

14. A torch for MIG welding according to claim 13, wherein the number of said blades is in a range of three to nine.

15. A torch for MIG welding according to claim 13, wherein said blades are angularly spaced at equal intervals around said tip.

16. A torch for MIG welding according to claim 13, wherein said blades are disposed in multiple axially spaced rows, rotatable in unison together, and
wherein the blades in each said row are kept out of axial alignment with the blades of an adjacent one of said rows when viewed axially along said tip.

17. A torch for MIG welding according to claim 11, wherein said foreign matter remover extends to a distal end of said gas nozzle and is in substantial contact with an inner surface of said nozzle.

18. A torch for MIG welding according to claim 11, wherein said rotor comprises a ceramic material.

19. A torch for MIG welding according to claim 11, wherein said foreign matter remover comprises an air receiver, which is subject to rotary power in the same direction as said rotor.

20. A torch for MIG welding according to claim 11, wherein said foreign matter remover comprises two helical plates having a shape formed by twisting respective thin elongate plates the same number of times in one direction about their longitudinal axes, said helical plates being arranged such that said helical plates have successive twists held 90° out of phase with each other.

* * * * *